(12) United States Patent
McCulloch et al.

(10) Patent No.: US 8,985,689 B2
(45) Date of Patent: Mar. 24, 2015

(54) RECLINER MECHANISM

(71) Applicant: Lear Corporation, Southfield, MI (US)

(72) Inventors: Peter R. McCulloch, Grosse Pointe Woods, MI (US); James S. Wawrzyniak, Warren, MI (US)

(73) Assignee: Lear Corporation, Southfield, MI (US)

( * ) Notice: Subject to any disclaimer, the term of this patent is extended or adjusted under 35 U.S.C. 154(b) by 12 days.

(21) Appl. No.: 13/772,403

(22) Filed: Feb. 21, 2013

(65) Prior Publication Data
US 2014/0001807 A1    Jan. 2, 2014

Related U.S. Application Data

(60) Provisional application No. 61/664,851, filed on Jun. 27, 2012.

(51) Int. Cl.
*B60N 2/235*    (2006.01)
*A47C 1/026*    (2006.01)

(52) U.S. Cl.
CPC .............. *A47C 1/026* (2013.01); *B60N 2/2356* (2013.01)
USPC ........................................ 297/367 P

(58) Field of Classification Search
CPC ...... A47C 1/026; B60N 2/2236; B60N 2/235; B60N 2/2356
USPC .................... 297/366, 367 R, 367 P
See application file for complete search history.

(56) References Cited

U.S. PATENT DOCUMENTS

| | | | |
|---|---|---|---|
| 6,561,585 B2 * | 5/2003 | Cilliere et al. | 297/367 R |
| 7,744,157 B2 * | 6/2010 | Ishihara et al. | 297/367 P |
| 7,766,429 B2 * | 8/2010 | Kuroda et al. | 297/367 P |
| 7,828,386 B2 * | 11/2010 | Reubeuze et al. | 297/367 P |
| 2007/0040436 A1 * | 2/2007 | Oki | 297/367 |
| 2009/0302658 A1 * | 12/2009 | Fassbender et al. | 297/367 P |
| 2011/0012414 A1 * | 1/2011 | Yamada et al. | 297/367 P |
| 2011/0169314 A1 * | 7/2011 | Tanguy et al. | 297/367 P |

FOREIGN PATENT DOCUMENTS

DE    102005021356 A1    11/2006
WO    2006/117330 A1    11/2006

* cited by examiner

*Primary Examiner* — Philip Gabler
(74) *Attorney, Agent, or Firm* — Brooks Kushman P.C.

(57) ABSTRACT

A recliner mechanism for a seat. The recliner mechanism may include a first plate, a second plate, and a set of pawls. A pawl may extend between a set of teeth on the second plate and into a pawl tooth opening on the first plate to inhibit rotation of the second plate.

20 Claims, 10 Drawing Sheets

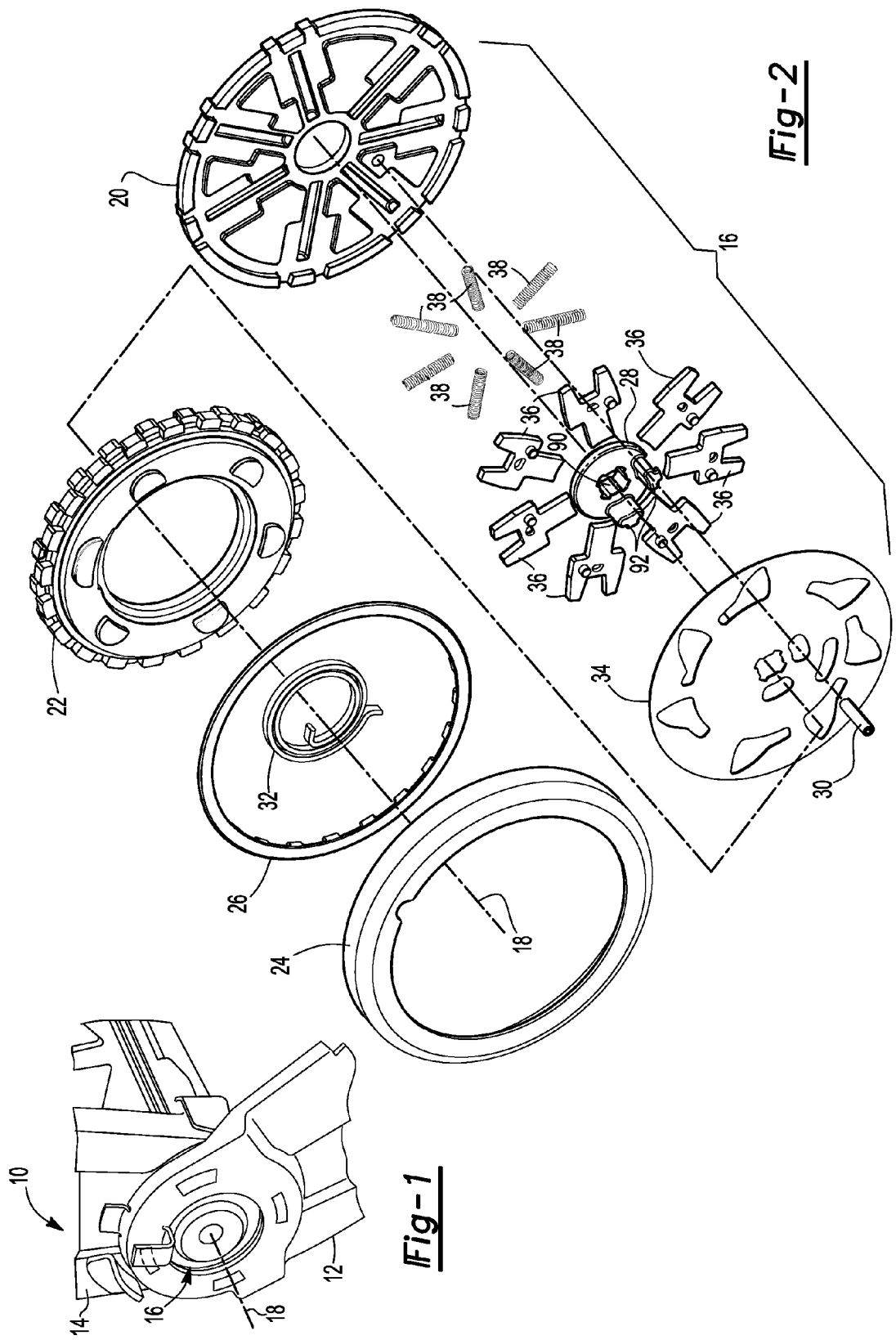

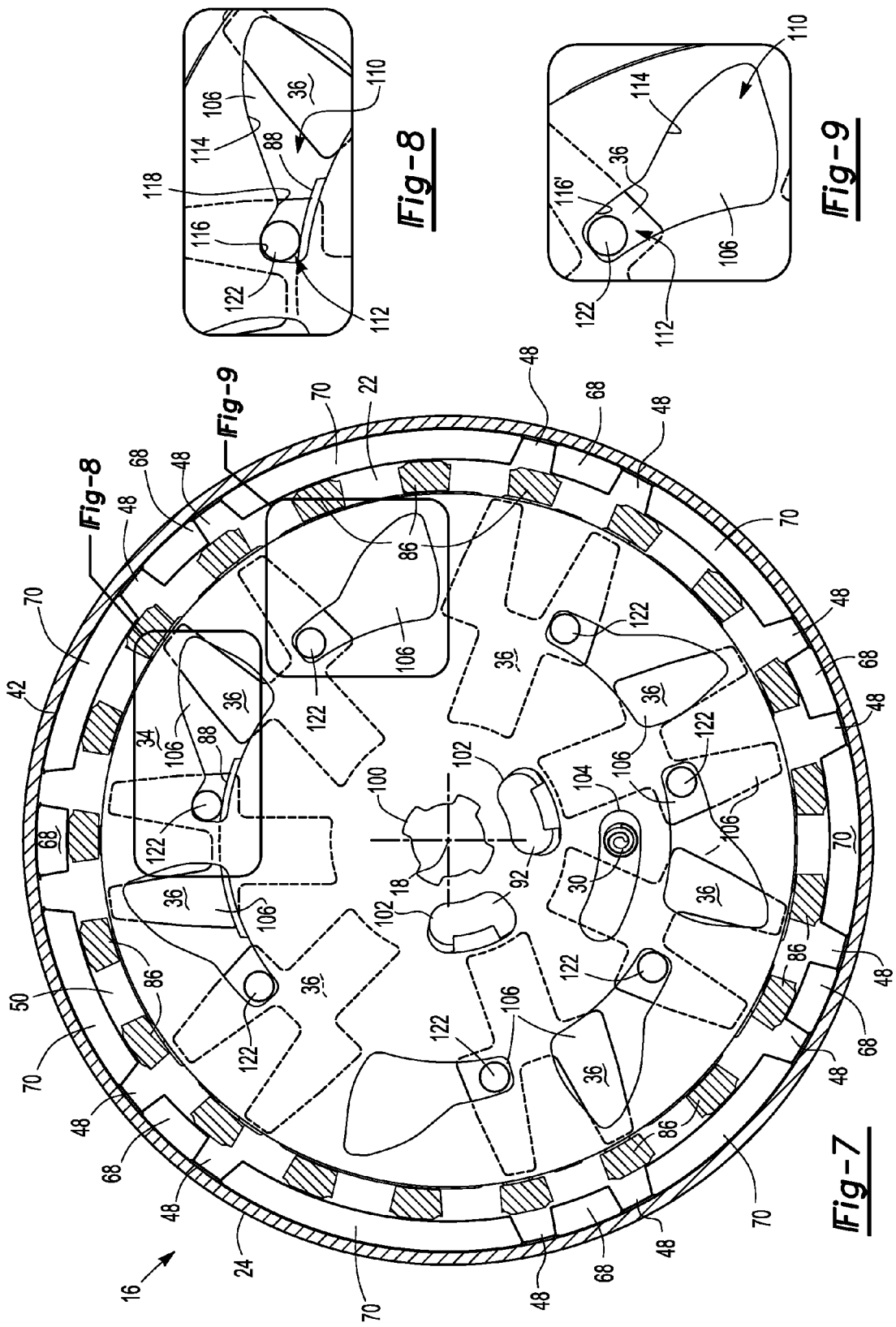

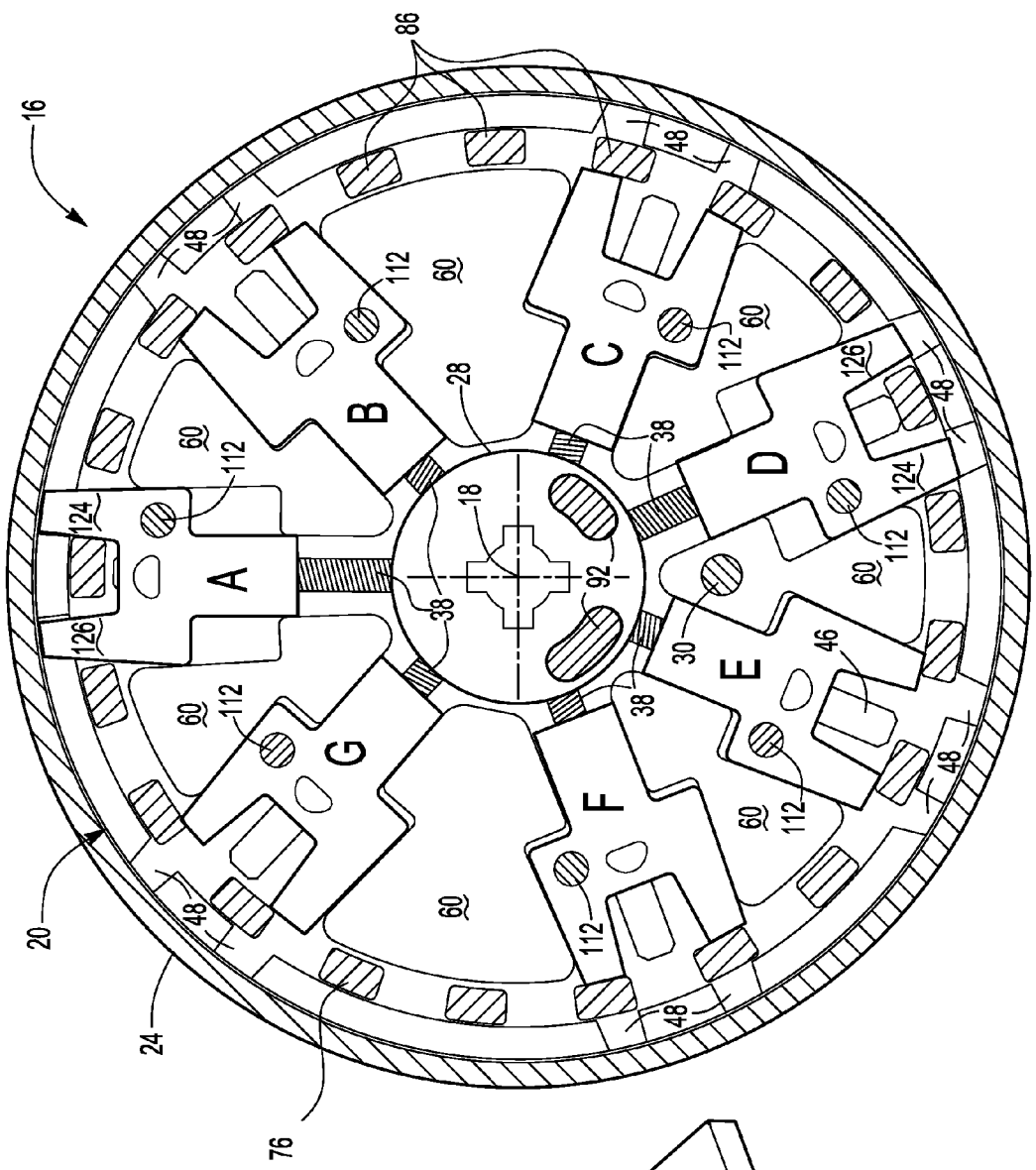
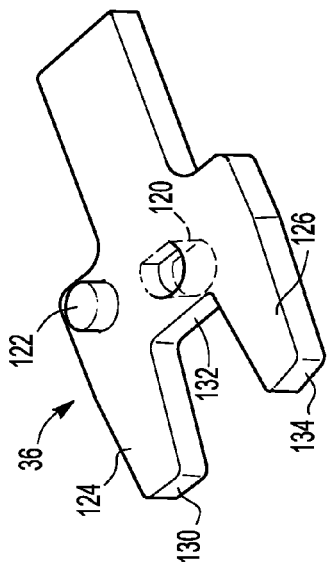
Fig-11
Fig-10

US 8,985,689 B2

RECLINER MECHANISM

CROSS-REFERENCE TO RELATED APPLICATIONS

This application claims the benefit of U.S. provisional Application No. 61/664,851 filed Jun. 27, 2012, the disclosure of which is incorporated in its entirety by reference herein.

TECHNICAL FIELD

This application relates to a seat assembly and a recliner mechanism for a seat assembly.

BACKGROUND

An adjustment device for a backrest of a vehicle seat is disclosed in PCT patent application no. WO 2006/117330.

SUMMARY

In at least one embodiment, a recliner mechanism is provided. The recliner mechanism may include a first plate, a second plate, and a set of pawls. The first plate may have a ring groove, a set of pawl slots, and a set of pawl tooth openings that may extend between the ring groove and an outer surface of the first plate. The second plate may be configured to rotate with respect to the first plate. The second plate may have a set of teeth that may be received in the ring groove. Each pawl may be received in a pawl slot. A first member of the set of pawls may extend between members of the set of teeth and into a first pawl tooth opening, and a second member of the set of pawls may extend between members of the set of teeth but not into a member of the set of pawl tooth openings to inhibit rotation of the second plate with respect to the first plate.

In at least one embodiment, a recliner mechanism is provided. The recliner mechanism may include a first plate, a second plate, and a set of pawls. The first plate may have a ring groove, a set of pawl slots that may intersect the ring groove, and a set of pawl tooth openings that may extend outwardly from the ring groove. The second plate may be configured to rotate with respect to the first plate and may have a set of teeth that may be received in the ring groove. Each pawl may be received in a pawl slot and may have a master PEL pin and a slave PEL pin that may have different configurations. The master and slave PEL pins of a first member of the set of pawls may extend between members of the set of teeth and into different members of the set of pawl tooth openings to inhibit rotation of the second plate with respect to the first plate.

In at least one embodiment, a recliner mechanism is provided. The recliner mechanism may have a first plate, a second plate, and a set of pawls. The first plate may have a ring groove, a set of pawl slots disposed adjacent to the ring groove, and a set of pawl tooth openings disposed adjacent to the ring groove. The second plate may be configured to rotate with respect to the first plate. The second plate may have a set of teeth that may be received in the ring groove. Each pawl may be received in a pawl slot. Only a first member of the set of pawls may extend between members of the set of teeth and into a member of the set of pawl tooth openings to inhibit rotation of the second plate with respect to the first plate.

BRIEF DESCRIPTION OF THE DRAWINGS

FIG. 1 is a perspective view of a portion of a seat assembly having a recliner mechanism.

FIG. 2 is an exploded view of the recliner mechanism.

FIG. 7 is a section view of the recliner mechanism showing the cam disc and all pawls in a refracted position.

FIGS. 8 and 9 are magnified views of portions of the recliner mechanism shown in FIG. 7.

FIG. 10 is a perspective view of a pawl that may be provided with the recliner mechanism.

FIGS. 11-17 are section views of a recliner mechanism that illustrate exemplary pawl positions.

DETAILED DESCRIPTION

Figure 3:
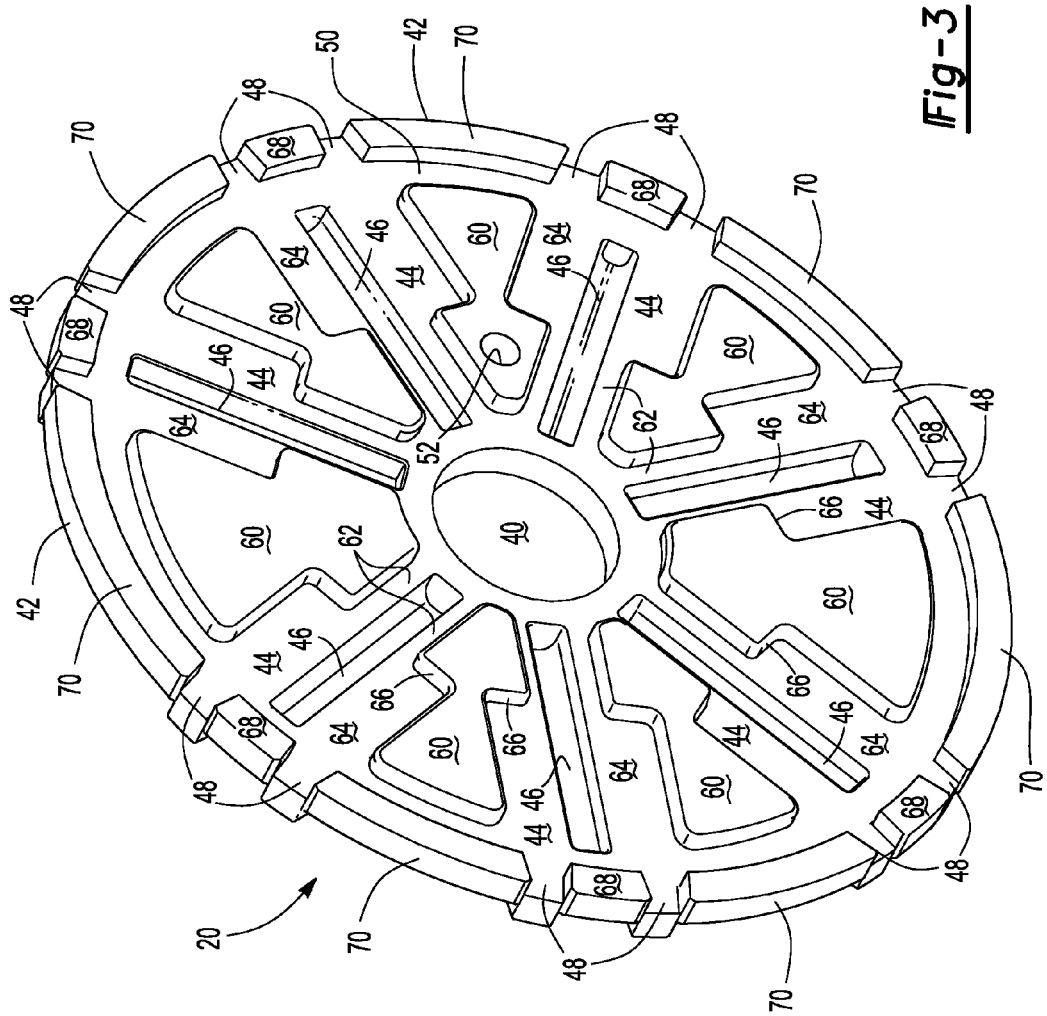
FIG. 3 is a perspective view of a first plate that may be provided with the recliner mechanism.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, a portion of a seat assembly 10 is shown. The seat assembly 10 may have a seat bottom 12, a seat back 14, and a recliner mechanism 16. The recliner mechanism 16 may be configured to control pivoting of the seat back 14 about an axis of rotation or axis 18 with respect to the seat bottom 12. One or more recliner mechanisms 16 may be provided with the seat assembly 10. For example, a pair of recliner mechanisms 16 may be disposed along opposing lateral sides of the seat back 14 to selectively permit or inhibit pivoting of the seat back 14.

Referring to FIG. 2, an exploded view of the recliner mechanism 16 is shown. The recliner mechanism 16 may include a first plate 20, a second plate 22, a retainer ring 24, a glide 26, a hub 28, a pin 30, a cam disc return spring 32, a cam disc 34, a set of pawls 36, and a set of pawl springs 38.

Referring to FIGS. 2 and 3, an exemplary first plate 20 is shown. The first plate 20 may be adapted to be mounted to the seat assembly 10. For instance, the first plate 20 may be fixedly positioned on or with respect to a seat bottom 12. In at least one embodiment, the first plate 20 may be generally configured as a circular disc and may include a center hole 40, an outer surface 42, a set of pawl slots 44, a plurality of spring slots 46, a set of pawl tooth openings 48, a ring groove 50, and a pin hole 52.

The center hole 40 may receive the hub 28 and may allow the hub 28 to rotate about the axis 18. In at least one embodiment, the center hole 40 may be disposed at the center of the first plate 20 and may be radially disposed about the axis 18.

The outer surface 42 may be disposed opposite the center hole 40 and may face toward and may engage the retainer ring 24. In at least one embodiment, the outer surface 42 may be radially disposed with respect to the axis 18 and may at least partially define an outside circumference of the first plate 20.

The set of pawl slots 44 may be provided in a surface of the first plate 20 that faces toward the second plate 22. In FIGS. 2 and 3, seven pawl slots 44 are shown, although it is contemplated that a different number of pawl slots 44 may be provided. Each pawl slot 44 may be configured to receive and guide movement of a corresponding pawl 36. The pawl slots 44 may be disposed between the center hole 40 and the outer surface 42 and may extend radially with respect to the axis 18. In at least one embodiment, the pawl slots 44 may be spaced apart from each other and located between one or more guide features 60 that extend from the first plate 20. In addition, the pawl slots 44 may be narrower near the center hole 40 than near the ring groove 50. For example, each pawl slot 44 may have a first portion 62 that may be disposed near the center hole 40 and a second portion 64 that may extend from the first portion 62 to the ring groove 50. The first portion 62 may be narrower than the second portion 64. As such, the distance between guide features 60 that help define the first portion 62 may be less than the distance between guide features 60 that help define the second portion 64. Moreover, a step surface 66 may be provided on a guide feature 60 that may limit movement of a corresponding pawl 36 toward the axis 18.

A spring slot 46 may be provided adjacent to each pawl slot 44. Each spring slot 46 may be configured to receive a pawl spring 38. Each spring slot 46 may be configured as a recess in the first plate 20 that may extend radially with respect to the axis 18 and may be located between the center hole 40 and the ring groove 50.

The set of pawl tooth openings 48 may be arranged such that each pawl tooth opening 48 is aligned with a corresponding pawl slot 44. For example, a pawl tooth opening 48 may be disposed on the opposite side of the ring groove 50 from each pawl slot 44. Each pawl tooth opening 48 may be disposed proximate or adjacent to the outer surface 42 of the first plate 20 and may extend to or toward the ring groove 50. In the embodiment shown, two pawl tooth openings 48 are aligned with each pawl slot 44 and disposed on the opposite sides of a spacer tooth 68; however, it is contemplated that a greater or lesser number of pawl slots 44 and/or spacer teeth 68 may be provided. Each pawl tooth opening 48 may be configured to receive a corresponding PEL pin on a pawl 36 when the pawl 36 is fully extended away from center hole 40 as will be discussed in more detail below. In addition, a second spacer tooth 70 may be provided between pawl tooth openings 48 that are aligned with different pawl slots 44 or that receive different pawls 36. The second spacer tooth 70 may be wider or larger than the first spacer tooth 68.

The ring groove 50 may receive a portion of the second plate 22 and may facilitate rotation of the second plate 22 as will be discussed in more detail below. The ring groove 50 may be configured as a ring that may extend around the first plate 20. For example, the ring groove 50 may be radially disposed with respect to the axis 18 and may extend continuously around the axis 18. The ring groove 50 may be disposed between and may be spaced apart from the center hole 40 and the outer surface 42. In FIGS. 2 and 3, the ring groove 50 is disposed between each pawl slot 44 and the set of pawl tooth openings 48. As such, the ring groove 50 may be disposed adjacent to and may intersect the second portion 62 of each pawl slot 44 and corresponding members of the set of pawl tooth openings 48.

The pin hole 52 may be configured to receive the pin 30. The pin hole 52 may be provided in the first plate 20 and may be spaced apart from the pawl slots 44. For example, the pin hole 52 may be provided in a guide feature 60.

Figure 4:
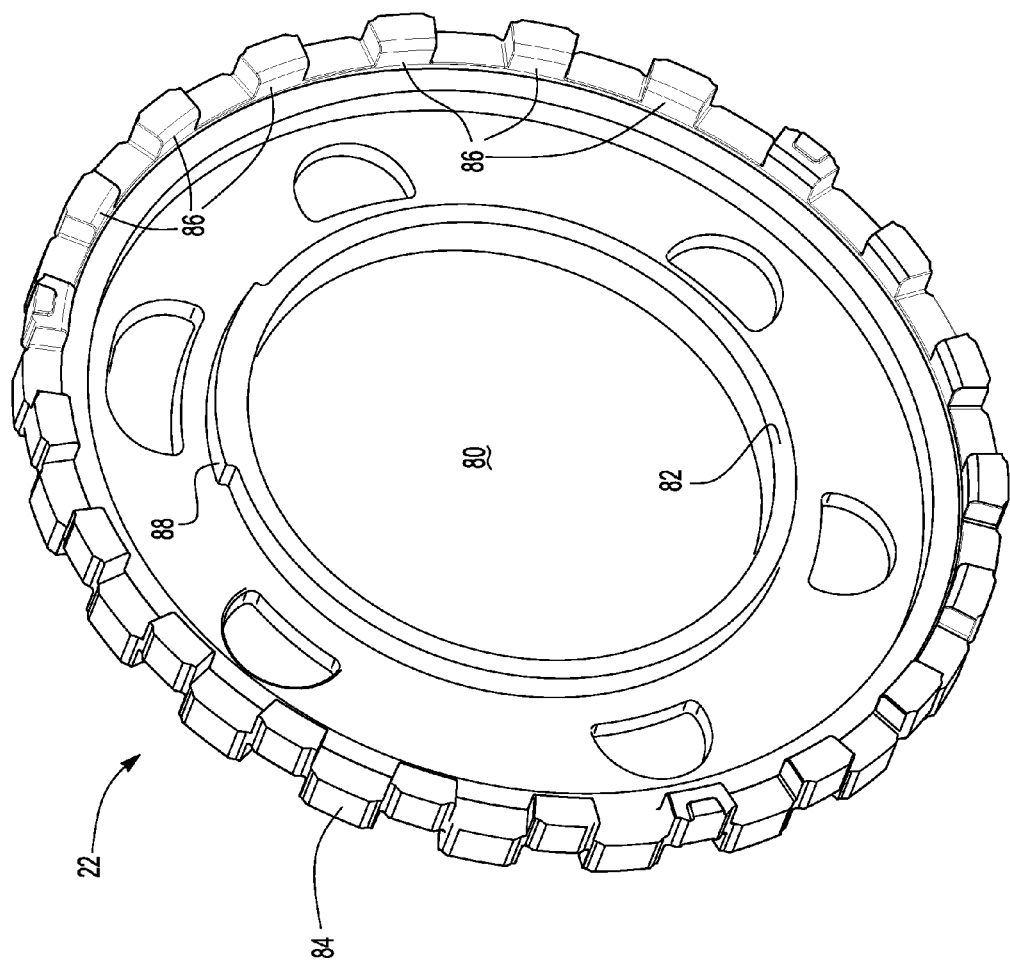
FIG. 4 is a perspective view of a second plate that may be provided with the recliner mechanism.

Referring to FIGS. 2 and 4, an exemplary second plate 22 is shown. The second plate 22 may be configured to rotate about the axis 18 with respect to the first plate 20. In at least one embodiment, the second plate 22 may include a center hole 80, a center ring 82, an outside surface 84, a set of teeth 86, and a dump ramp 88.

The center hole 80 may receive the hub 28 such that the hub 28 may rotate about the axis 18. In at least one embodiment, the center hole 80 may be disposed at the center of the second plate 22 and may be radially disposed about the axis 18. The center hole 80 may be at least partially defined by the center ring 82, which may extend around the axis 18 and may extend toward the first plate 20.

The outside surface 84 may be disposed opposite the center hole 80 and may face toward the retainer ring 24. In at least one embodiment, the outside surface 84 may be radially disposed with respect to the axis 18 and may at least partially define an outside diameter or outside circumference of the second plate 22. The second plate 22 may have a smaller diameter than the first plate 20.

Figure 6:
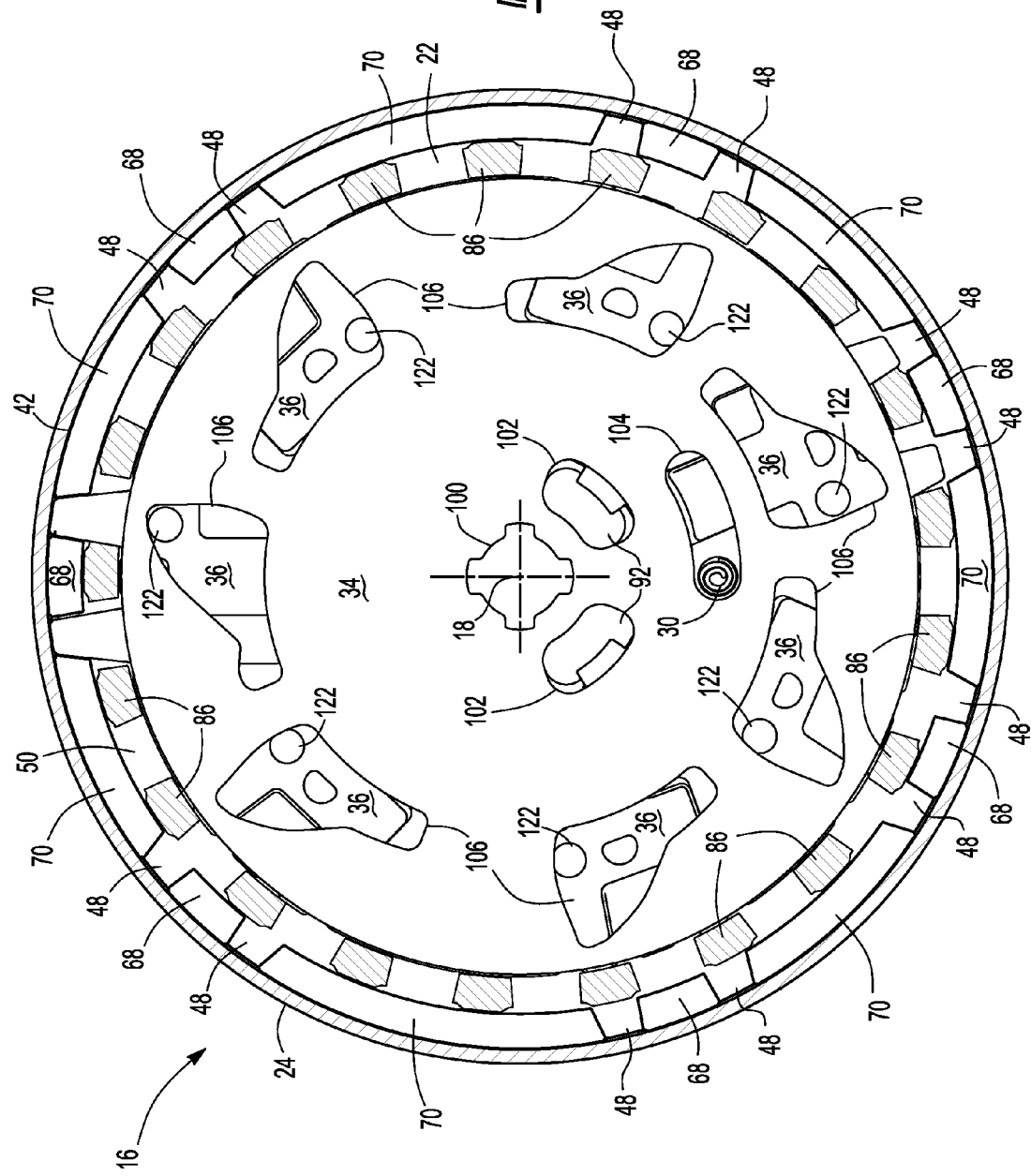
FIG. 6 is a section view of the recliner mechanism showing the cam disc and a pawl in a fully extended position and another pawl in a partially extended position.

The set of teeth 86 may be disposed between the outside surface 84 and the center hole 80. For instance, the teeth 86 may be disposed proximate or adjacent to the outside surface 84 and may extend from an inside surface of the second plate 22 toward the first plate 20. As such, the set of teeth 86 may extend generally parallel to the axis 18. The teeth 86 may be spaced apart from each other and provided in repeating arrangement. For example, the teeth 86 may be radially disposed with respect to the axis 18 and may be received in the ring groove 50 as best shown in FIG. 6.

The dump ramp 88 may extend outwardly from the center ring 82 or away from the axis 18. The dump ramp 88 may be configured as a localized bulge that may extend from the center ring 82 and from the inside surface of the second plate 22 toward the first plate 20. The dump ramp 88 may not extend around the center ring 82, but instead may be localized along an acute angle or sector of the center ring 82. The dump ramp 88 may cooperate with a pawl 36 to hold the cam disc 34 in a recliner open position as will be discussed in more detail below.

Referring to FIG. 2, the retainer ring 24 may help secure the second plate 22 between the first plate 20 and the retainer ring 24. For example, the retainer ring 24 may be fixedly disposed on the first plate 20 and may not be fixedly disposed on the second plate 22. As such, the second plate 22 may be received between the retainer ring 24 and the first plate 20 and may rotate about the axis 18 with respect to the retainer ring 24 and first plate 20. The retainer ring 24 may be fixedly disposed on the first plate 20 in any suitable manner, such as by welding, an interference fit, or by the use of one or more fasteners.

The glide 26 may act as a spacer that separates the second plate 22 from the retainer ring 24. The glide 26 may be located between the retainer ring 24 and the back side of the second plate 22. The glide 26 may be configured as a ring that may extend continuously around and may be spaced apart from the axis 18.

The hub 28 may be configured to rotate about the axis 18 to actuate the pawls 36 as will be discussed in more detail below. The hub 28 may be received in the center hole 40 of the first plate 20 and the center hole 80 of the second plate 22. The hub 28 may include a center opening 90 that may receive an input shaft that may rotate the hub 28 about the axis 18. The hub 28 may include one or more hub protrusions 92. In the embodiment shown, two hub protrusions 92 are provided that are spaced apart from each other and located near the outside surface or outside circumference of the hub 28. The hub protrusions 92 may extend through the cam disc 34 and may engage the cam disc return spring 32 as will be discussed in more detail below.

The pin 30 may couple the first plate 20 to the cam disc return spring 32. The pin 30 may be fixedly disposed on the first plate 20. For example, the pin 30 may be disposed in the pin hole 52 on the first plate 20 and may extend through an opening in the cam disc 34 toward the second plate 22 and the cam disc return spring 32.

The cam disc return spring 32 may be disposed in the center hole 80 of the second plate 22. In at least one embodiment, the cam disc return spring 32 may be configured as a spiral spring or a clock spring that may have a first end and a second end. The first end may extend toward the axis 18 and may engage the hub 28. The second end may be disposed opposite the first end and may extend generally away from the axis 18 and may engage the pin 30. The cam disc return spring 32 may exert a biasing force on the hub 28 that may bias the hub 28 and the cam disc 34 in a counterclockwise direction about the axis 18 from the perspective shown in FIGS. 2, 6 and 7.

Figure 5:
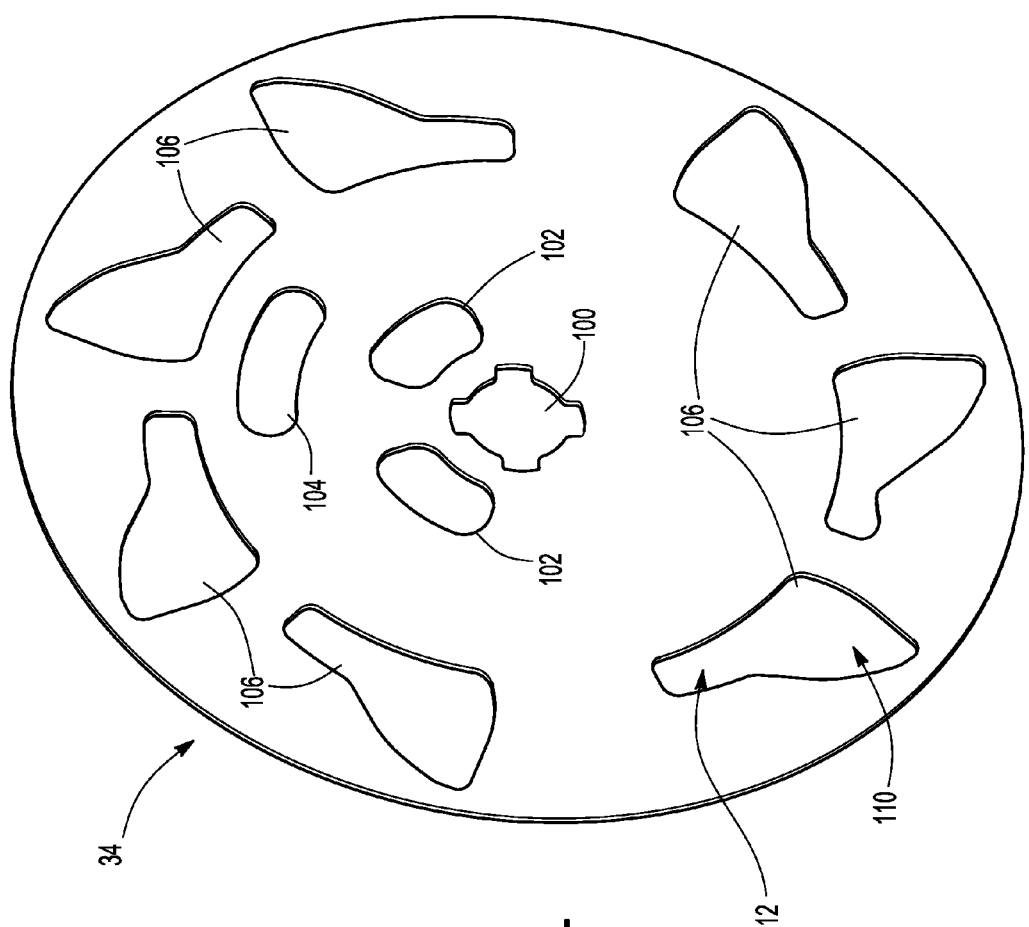
FIG. 5 is a perspective view of a cam disc that may be provided with the recliner mechanism.

Referring to FIGS. 1 and 5, an example of a cam disc 34 is shown. The cam disc 34 may couple the hub 28 to the pawls 36. The cam disc 34 may be configured as a generally planar plate or disc that may have a plurality of openings. These openings may include a center opening 100, at least one hub protrusion opening 102, a pin opening 104, and a set of pawl actuation openings 106.

The center opening 100 may receive and may engage the input shaft that may rotate the hub 28 about the axis 18.

One or more hub protrusion openings 102 may be aligned with and may receive a corresponding hub protrusion 92. In FIGS. 2 and 5, two hub protrusion openings 102 are provided that may be spaced apart from the center opening 100 and spaced apart from each other. The hub protrusion openings 102 may be disposed further from the axis 18 than the center opening 100.

The pin opening 104 may receive the pin 30. The pin 30 may engage the ends of the pin opening 104 to limit the range of motion of the cam disc 34 about the axis 18 or may be spaced apart from the ends of the pin opening 104 throughout its range of motion. The pin opening 104 may be disposed further from the axis 18 than the center opening 100 and/or hub protrusion opening 102.

The pawl actuation openings 106 may be disposed between the hub protrusion openings 102 and an outside surface or outside circumference of the cam disc 34. Each pawl actuation opening 106 may be configured to guide movement of a corresponding pawl 36 when the cam disc 34 is rotated about the axis 18, such as when a pawl 36 is retracted.

Referring to FIGS. 8 and 9, the pawl actuation openings 106 may be provided in multiple configurations. For example, at least one pawl actuation opening 106 may have the configuration shown in FIG. 8 while the remaining pawl actuation openings 106 may have the configuration shown in FIG. 9.

In FIG. 8, the pawl actuation opening 106 has a first opening portion 110 and a second opening portion 112. The first opening portion 110 may include a first ramp surface 114 that may engage and guide movement of a corresponding pawl 36. The first ramp surface 114 may generally be concave with respect to the axis 18. The second opening portion 112 may be smaller than the first opening portion 110 and may be larger than a cam pin on the pawl 36 as will be discussed in more detail below. The second opening portion 112 may have a second ramp surface 116 that may also be concave with respect to the axis 18. The first and second ramp surfaces 114, 116 may be concave in opposite directions and may cooperate to form a hump 118. The hump 118 may extend toward the axis 18 or further toward the axis 18 than adjacent portions of the first and second ramp surfaces 114, 116, thereby narrowing the opening between the first and second opening portions 110, 112. The hump 118 may cause a corresponding pawl 36 to be retracted further than the other pawls 36 (i.e., move over the hump 118 and thus move further toward the axis 18 than the other pawls 36) when the cam disc 34 is rotated counterclockwise from the perspective shown. In addition, the hump 118 and dump ramp 88 may cooperate to hold the recliner mechanism 16 in a recliner open position. More specifically, the hump 118 and dump ramp 88 may cooperate to hold a cam pin of a pawl 36 in the second opening portion 112 as will be discussed in more detail below.

In FIG. 9, another example of a pawl actuation opening 106 is shown. In this embodiment, no hump is provided between the first and second opening portions 110, 112. As such, the first and second ramp surfaces 114, 116' may generally be concave with respect to the axis 18 and concave in the same direction such that the opening between the first and second opening portions 110, 112 does not narrow in a direction extending from the second opening portion 112 toward the first opening portion 110. As such, a cam pin of a pawl 36 may not be captured in the second opening portion 112 by the dump ramp 88.

Referring to FIGS. 2 and 10, the set of pawls 36 will now be described in more detail. The pawls 36 may be disposed between the first plate 20 and the second plate 22. Each pawl 36 may be received in a corresponding pawl slot 44 and may be configured to move radially between a retracted position and a fully extended position. In the retracted position, a pawl 36 may be actuated toward the axis 18 to permit the second plate 22 to rotate with respect to the first plate 20 and a pawl 36 may engage the step surface 66. In the fully extended position, a pawl 36 may be actuated away from the axis 18 to inhibit rotation of the second plate 22 as will be discussed in more detail below. Each pawl 36 may include a spring pin 120, a cam pin 122, a master PEL pin 124, and a slave PEL pin 126.

The spring pin 120 may be disposed near the center of each pawl 36 and may extend toward the first plate 20. More specifically, the spring pin 120 may extend into a corresponding spring slot 46 such that the spring pin 120 engages a corresponding pawl spring 38.

The cam pin 122 may extend toward the second plate 22 or in an opposite direction from the spring pin 120. The cam pin 122 may be offset from the spring pin 120 and may be offset from the center of a pawl 36. Each cam pin 122 may extend into a corresponding pawl actuation opening 106 of the cam disc 34 where it may engage surfaces of the cam disc 34 that define the pawl actuation opening 106. From the perspective shown in FIGS. 2 and 6, rotation of the cam disc 34 in a clockwise direction about the axis 18 may retract any pawl 36 that is in an extended position. More specifically, sufficient clockwise rotation of the cam disc 34 may cause the cam pin 122 of any extended pawl 36 to follow the first ramp surface 114 and second ramp surface 116 of the pawl actuation opening 106, thereby actuating the pawl 36 toward the axis 18 and ultimately to the position shown in FIG. 7.

The master PEL pin 124 may be located proximate the cam pin 122. The master PEL pin 124 may be slightly larger than the slave PEL pin 126. As such, the master PEL pin 124 may be configured to wedge against a tooth 86 on the second plate 22 to eliminate chuck when two pawls 36 are extended and engaged between teeth 86. The master PEL pin 124 may have a tapered configuration in which the master PEL pin 124 is narrower near an end surface 130 than near an intermediate surface 132 that may extend radially between the master and slave PEL pins 124, 126. The end surface 130 may be spaced apart from the first plate 20, the second plate 22, and/or the retainer ring 24 when the pawl is retracted or extended.

The slave PEL pin 126 may be spaced apart from the master PEL pin 124. The slave PEL pin 126 may provide additional strength for inhibiting rotation of the second plate 22 with respect to the first plate 20. Like the master PEL pin 124, the slave PEL pin 126 may have a tapered configuration in which the slave PEL pin 126 is narrower near an end surface 134 than near the intermediate surface 132. The end surface 134 may be spaced apart from the first plate 20, the second plate 22, and/or the retainer ring 24 when the pawl is retracted or extended.

The master PEL pin 124 may be spaced apart from the slave PEL pin 126 such that the master PEL pin 124 and slave PEL pin 126 do not simultaneously engage a tooth 86 that is disposed between the master and slave PEL pins 124, 126.

Referring to FIG. 2, each pawl spring 38 may independently bias a corresponding pawl 36 away from the axis 18. Each pawl spring 38 may be received in a corresponding spring slot 46 and may have a first end that engages the spring pin 120 and a second end that engages an end of the spring slot 46.

Referring to FIGS. 6, 7 and 11, operation of the recliner mechanism 16 will now be discussed in more detail.

In FIGS. 6 and 11, the recliner mechanism 16 is shown with in a locked position in which the second plate 22 is inhibited from rotating about the axis 18 with respect to the first plate 20 by one or more pawls. As is best shown in FIG. 11, the pawls 36 are designated with letters A through G to facilitate the discussion below. In FIGS. 6 and 11, pawl A is shown in a fully extended position in which the master and slave PEL pins 124, 126 extend between teeth 86 on the second plate 22 and into pawl tooth openings 48 on the first plate 20. As such, the master and slave PEL pins 124, 126 of this fully extended pawl 36 are both under a double shear load and inhibit rotation of the second plate 22. Pawl D is shown in a partially extended position in which its master and slave PEL pins 124, 126 extend between teeth 86 on the second plate 22 but not into pawl tooth openings 48 on the first plate 20 due to the position of the teeth 86, which are offset from and partially block the master PEL pin 124 from entering a pawl tooth opening 48. As such, the master and slave PEL pins 124, 126 of this partially extended pawl 36 are both under a single shear load and also inhibit rotation of the second plate 22. Pawls B, C, E, F, and G are shown in or near a retracted position in which the master and slave PEL pins 124, 126 do not extend between teeth 86 on the second plate 22 or into pawl tooth openings 48 on the first plate 20.

The pawls 36 may move from the positions shown in FIGS. 6 and 11 to the retracted position shown in FIG. 7 by rotating the hub 28. More specifically, rotation of hub 28 about the axis 18 in the clockwise direction from the perspective shown may rotate the cam disc 34 in the clockwise direction due to the interaction between the hub protrusions 92 and the hub protrusion opening 102 and/or rotation of the input shaft that may be received in the center opening 100 of the cam disc 34. Sufficient rotation of the cam disc 34 in the clockwise direction may cause the cam pins 122 of any extended pawl 36 (such as pawl A) or partially extended pawl (such as pawl D) to follow or slide along the first ramp surface 114 and second ramp surface 116 of the pawl actuation opening 106. The force exerted by the cam disc 34 on the cam pins 122 may overcome the biasing force exerted by the pawl springs 38 and actuate the pawls 36 toward the axis 18. Sufficient rotation of the cam disc 34 may cause any extended or partially extended pawls 36 to retract and disengage the teeth 86 on the second plate 22, which may allow the second plate 22 to rotate with respect to the first plate 20.

Extending the pawls may be accomplished by allowing the hub 28 to rotate in the opposite direction than was employed to retract the pawls 36. For example, the release or rotation of the hub 28 in the counterclockwise direction from the perspective shown in FIG. 7 may allow the pawls 36 to move from the retracted position toward the extended position to inhibit rotational movement of the second plate 22. Such rotation may be due to the biasing force exerted by the cam disc return spring 32. More specifically, counterclockwise rotation of the hub 28 may rotate the cam disc 34 in the counterclockwise direction due to the interaction between the hub protrusions 92 and the hub protrusion opening 102 and/or rotation of the input shaft that may be received in the center opening 100 of the cam disc 34. The biasing force exerted by the pawl springs 38 against the pawls 36 may actuate the pawls 36 away from the axis 18. The positioning of the teeth 86 on the second plate 22 may allow some, but not all of the pawls 36 to extend between the teeth 86. In at least one embodiment, only one pawl 36 may advance to the fully extended position while one other pawl or more than one other pawl may extend to the partially extended position.

Extension of the pawls may be inhibited when the cam disc 34 is in a recliner open position. In the recliner open position, rotation of the cam disc 34 may be inhibited, which in turn may inhibit extension of the pawls 36 from the retracted position.

Referring to FIG. 7, the cam disc 34 is shown in the recliner open position and positioned such that the dump ramp 88 interferes with movement of the pawl 36 that has a cam pin 122 that extends into the pawl actuation opening 106 of the cam disc 34 that has the hump 118. More specifically, when the second plate 22 is rotated such that the dump ramp 88 extends toward the hump 118, the gap between the dump ramp 88 and hump 118 is smaller than the diameter of the cam pin 122. As such, the cam pin 122 cannot fit between the dump ramp 88 and the hump 118 or retract over the hump 118, which thereby inhibits rotation of the cam disc 34 and holds the cam disc 34 in the recliner open position with all pawls 36 retracted. The recliner open position may be disengaged once the second plate 22 rotates to a position in which the dump ramp 88 does not extend toward the hump 118.

Referring to FIGS. 12-17 different exemplary combinations of pawl positions are shown in which rotation of the recliner mechanism 16 is inhibited. In each figure, one pawl is in a fully extended position another pawl in a partially extended position. The combination of a fully extended pawl and at least one partially extended pawl may result in zero chuck. Moreover, under high load conditions, a pawl 36 that was partially extended may either move to the fully extended position or more than one pawl 36 may extend to the partially extended position depending on the loading direction. As such, more than one pawl 36 may be partially extended and one or more pawls 36 may not be at least partially extended. In either case, the extension of the pawls may further help inhibit rotation of the second plate 22.

Figure 12:
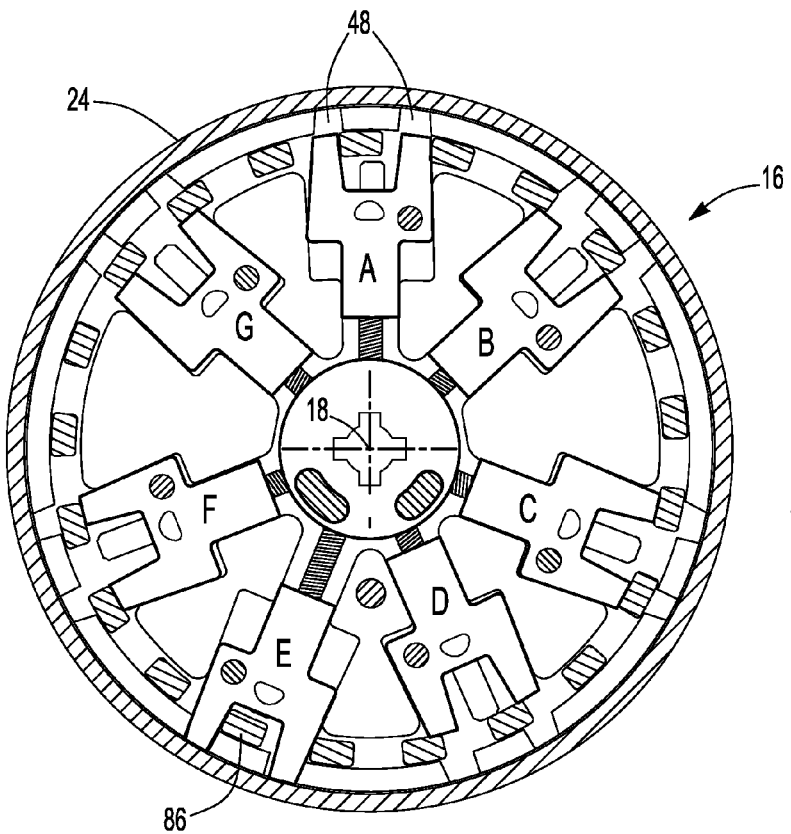

In FIG. 12, pawl E is in a fully extended position, pawl A is in a partially extended position, and the remaining pawls are not partially or fully extended. As such, pawls E and A are positioned to inhibit rotation of the second plate 22 with respect to the first plate 20.

Figure 13:
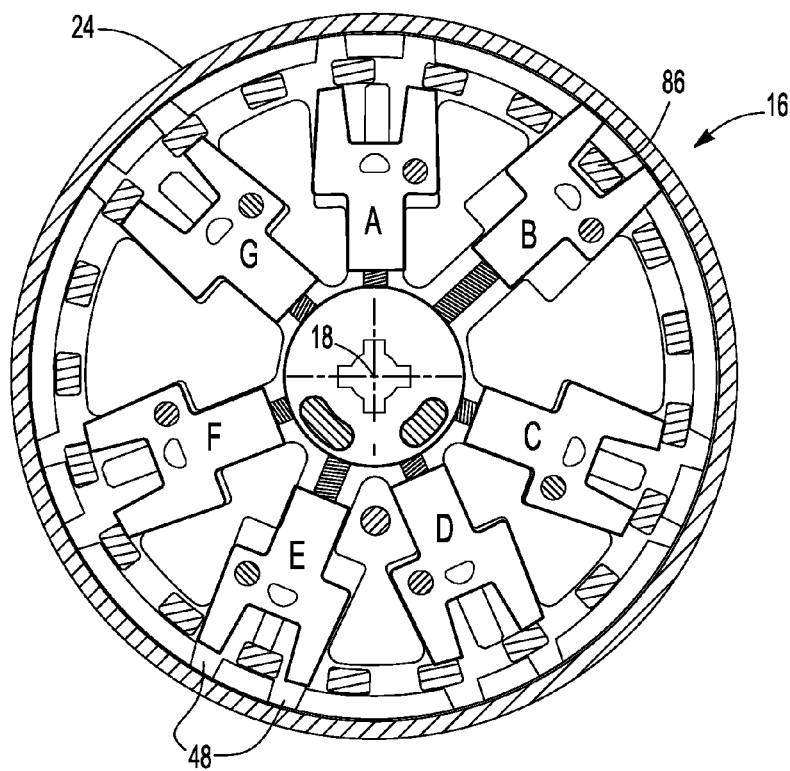

In FIG. 13, pawl B is in a fully extended position, pawl E is in a partially extended position, and the remaining pawls are not partially or fully extended. As such, pawls B and E are positioned to inhibit rotation of the second plate 22 with respect to the first plate 20.

Figure 14:
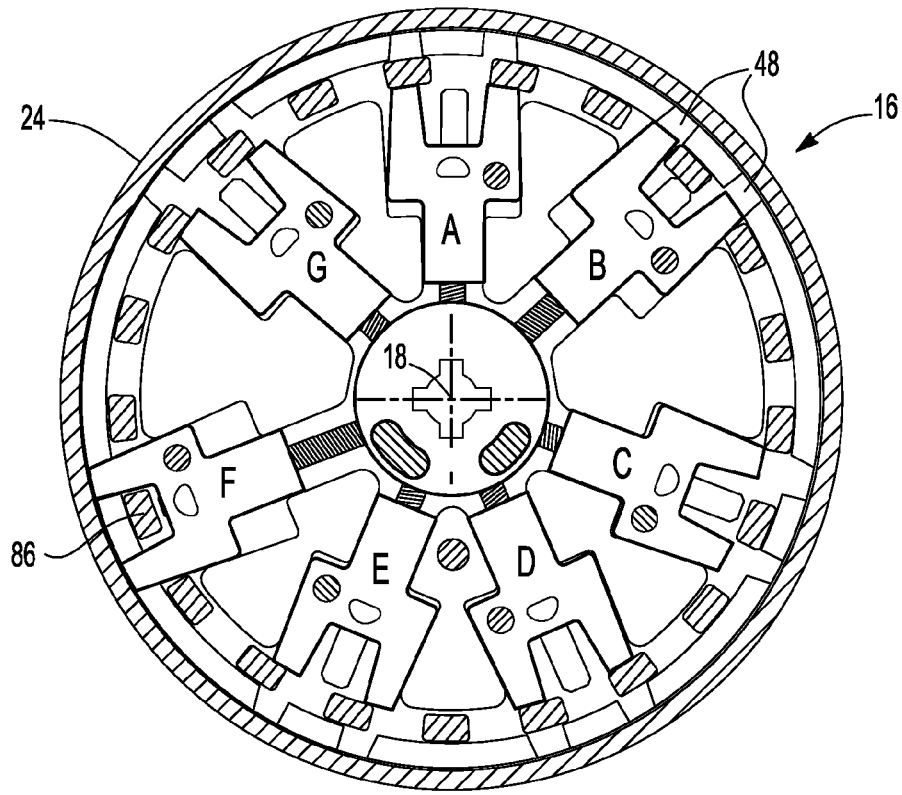

In FIG. 14, pawl F is in a fully extended position, pawl B is in a partially extended position, and the remaining pawls are not partially or fully extended. As such, pawls F and B are positioned to inhibit rotation of the second plate 22 with respect to the first plate 20.

Figure 15:
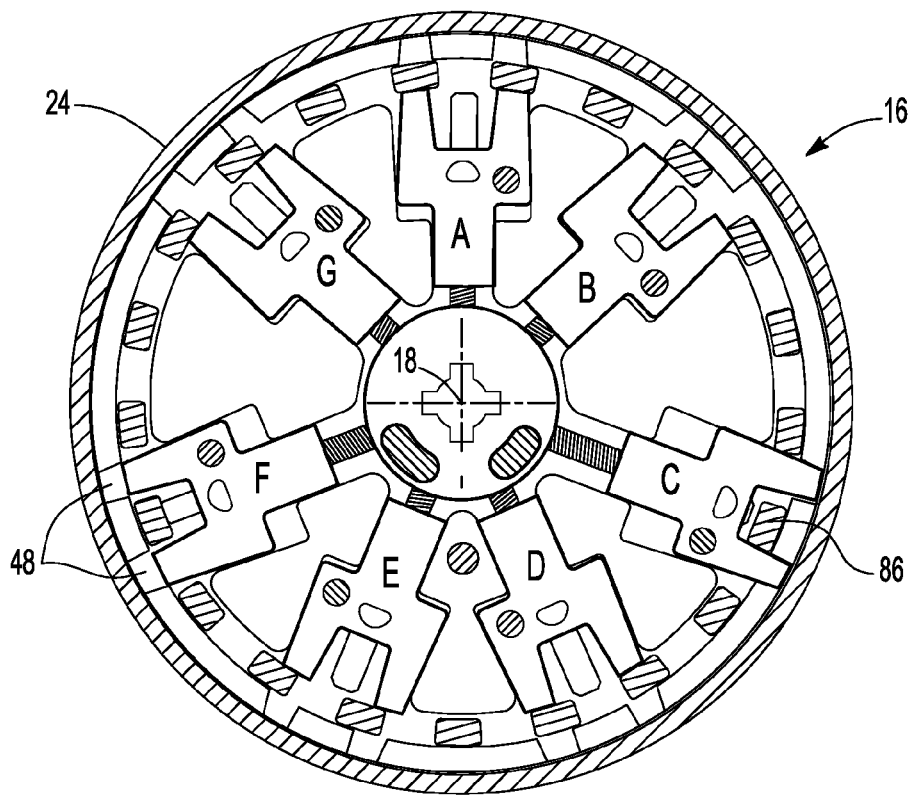

In FIG. 15, pawl C is in a fully extended position, pawl F is in a partially extended position, and the remaining pawls are not partially or fully extended. As such, pawls C and F are positioned to inhibit rotation of the second plate 22 with respect to the first plate 20.

Figure 16:
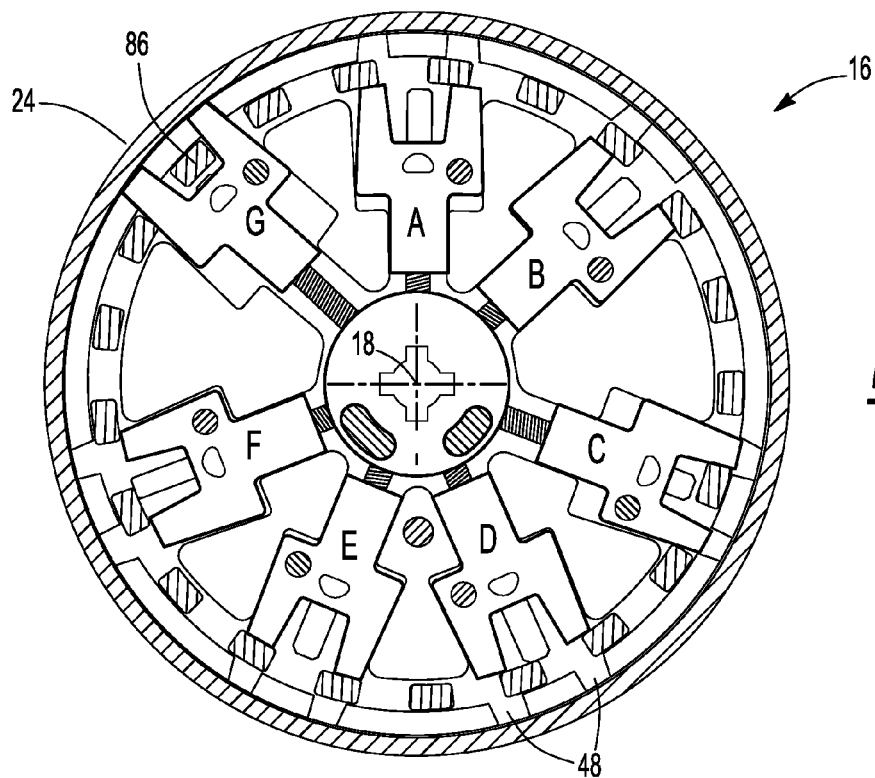

In FIG. 16, pawl G is in a fully extended position, pawl C is in a partially extended position, and the remaining pawls are not partially or fully extended. As such, pawls G and C are positioned to inhibit rotation of the second plate 22 with respect to the first plate 20.

Figure 17:
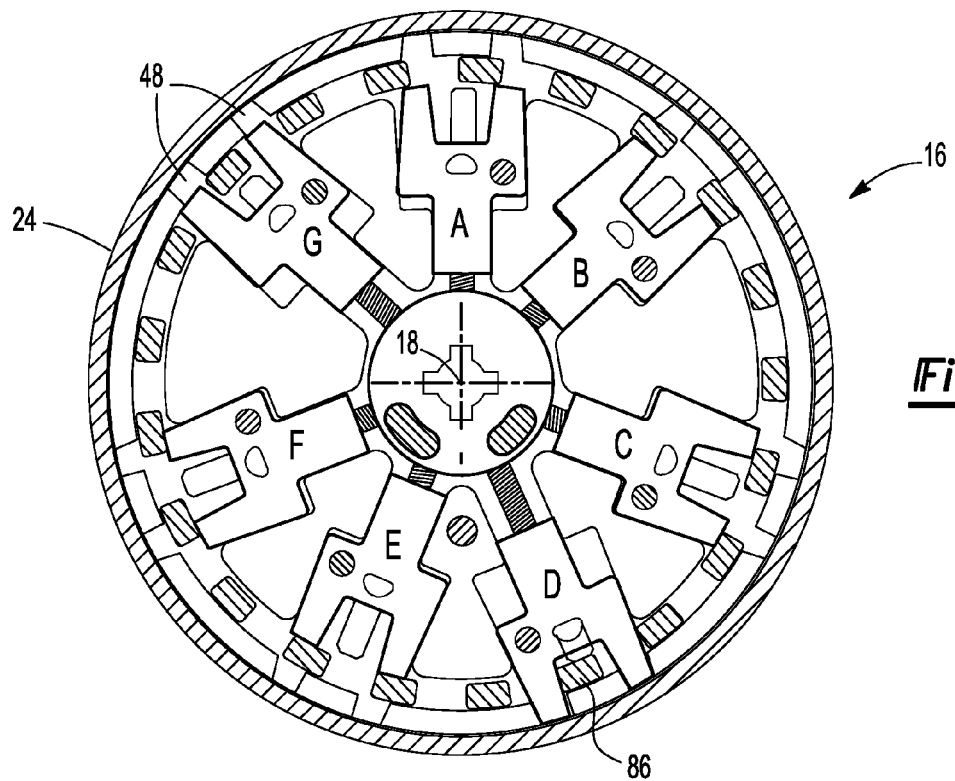

In FIG. 17, pawl D is in a fully extended position, pawl G is in a partially extended position, and the remaining pawls are not partially or fully extended. As such, pawls D and G are positioned to inhibit rotation of the second plate 22 with respect to the first plate 20.

In FIGS. 11-17, a pawl that is in a fully extended position is not disposed adjacent to a pawl that is partially extended. For instance, at least two pawls 36 separate a fully extended pawl from a partially extended pawl in either a clockwise or counterclockwise direction. Moreover, a fully extended pawl may not be disposed directly opposite a partially extended pawl in one or more embodiments. As such, fully and partially extended pawls may be actuated away from the axis 18 along different axes that may not coaxially arranged or disposed directly opposite each other. In other embodiments, a pawl that is in a fully extended position may be disposed adjacent to a pawl that is partially extended.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A recliner mechanism comprising:
a first plate having a ring groove, a set of pawl slots disposed proximate the ring groove, and a set of pawl tooth openings that extend between the ring groove and an outer surface of the first plate, wherein each pawl tooth opening is disposed between first and second spacer teeth of the first plate that extend between the ring groove and the outer surface;
a second plate configured to rotate with respect to the first plate, the second plate having a set of teeth that are received in the ring groove; and
a set of pawls, wherein each member of the set of pawls is received in a member of the set of pawl slots;
wherein a first member of the set of pawls extends between members of the set of teeth and into a first pawl tooth opening, and a second member of the set of pawls extends between members of the set of teeth but not into a member of the set of pawl tooth openings to inhibit rotation of the second plate with respect to the first plate.

2. The recliner mechanism of claim 1 wherein the ring groove is spaced apart from the outer surface and extends continuously around an axis of rotation.

3. The recliner mechanism of claim 1 wherein the ring groove intersects each member of the set of pawl slots.

4. The recliner mechanism of claim 1 wherein the second plate is configured to rotate about an axis of rotation and the set of teeth extend generally parallel to the axis of rotation into the ring groove.

5. The recliner mechanism of claim 1 wherein the set of teeth extend from an outside surface of the second plate.

6. The recliner mechanism of claim 1 wherein each member of the set of pawl slots includes a spring slot that receives a pawl spring that biases a member of the set of pawls toward the ring groove.

7. The recliner mechanism of claim 1 further comprising a cam disc disposed between the first and second plates, wherein the cam disc has a set of pawl actuation openings that are configured to actuate corresponding members of the set of pawls.

8. The recliner mechanism of claim 7 wherein one member of the set of pawl actuation openings has a different configuration than the other members of the set of pawl actuation openings.

9. The recliner mechanism of claim 7 wherein the second plate includes a dump ramp disposed proximate a center hole of the second plate, and one member of the set of pawl actuation openings has a hump, wherein rotation of the cam disc is inhibited when the dump ramp extends toward the hump such that a gap between the dump ramp and the hump is smaller than a cam pin.

10. A recliner mechanism comprising:
a first plate having a center hole, a ring groove, a set of pawl slots that intersect the ring groove, and a set of pawl tooth openings that extend outwardly from the ring groove to an outer surface of the first plate that is disposed opposite the center hole, wherein each pawl tooth opening is disposed between first and second spacer teeth of the first plate that are disposed between the ring groove and the outer surface;
a second plate configured to rotate with respect to the first plate, the second plate having a set of teeth that are received in the ring groove; and
a set of pawls, wherein each member of the set of pawls is received in a member of the set of pawl slots and has a master pin and a slave pin having a different configuration than the master pin;
wherein the master and slave pins of a first member of the set of pawls extend between members of the set of teeth and into different members of the set of pawl tooth openings to inhibit rotation of the second plate with respect to the first plate.

11. The recliner mechanism of claim 10 wherein a member of the set of teeth that is received between the master pin and the slave pin of a pawl does not engage the master pin and a slave pin simultaneously.

12. The recliner mechanism of claim 10 wherein the master pin is larger than the slave pin.

13. The recliner mechanism of claim 12 wherein the master pin is configured to wedge against a member of the set of teeth on the second plate to eliminate chuck when two pawls are disposed between members of the set of teeth.

14. A recliner mechanism comprising:
a first plate having an outer surface that extends around an axis, a ring groove that is spaced apart from the outer surface, a set of pawl slots disposed adjacent to the ring groove, and a set of pawl tooth openings, wherein each member of the set of pawl tooth openings is defined by a first spacer tooth and a second spacer tooth that extends from the ring groove to the outer surface and is disposed on an opposite side of the ring groove from the set of pawl slots;

a second plate configured to rotate about the axis with respect to the first plate, the second plate having a set of teeth that are received in the ring groove; and a set of pawls, wherein each member of the set of pawls is received in a member of the set of pawl slots;

wherein only a first member of the set of pawls extends between members of the set of teeth and into a member of the set of pawl tooth openings to inhibit rotation of the second plate with respect to the first plate.

15. The recliner mechanism of claim 14 wherein each member of the set of pawls that does not extend into a member of the set of pawl tooth openings engages a member of the set of teeth.

16. The recliner mechanism of claim 14 wherein a second member of the set of pawls extends between members of the set of teeth but is not received in a member of the set of pawl tooth openings when rotation of the second plate with respect to the first plate is inhibited.

17. The recliner mechanism of claim 16 wherein each member of the set of pawls that does not extend between members of the set of teeth engages a member of the set of teeth.

18. The recliner mechanism of claim 16 wherein the first and second members of the set of pawls move along different axes and are not disposed directly opposite each other.

19. The recliner mechanism of claim 16 wherein the first and second members of the set of pawls are not disposed adjacent to each other such that at least one member of the set of pawls is disposed between the first and second members of the set of pawls.

20. The recliner mechanism of claim 14 wherein only a second member of the set of pawls extends between members of the set of teeth but is not received in a member of the set of pawl tooth openings when rotation of the second plate with respect to the first plate is inhibited.

* * * * *